United States Patent Office 3,452,226
Patented June 24, 1969

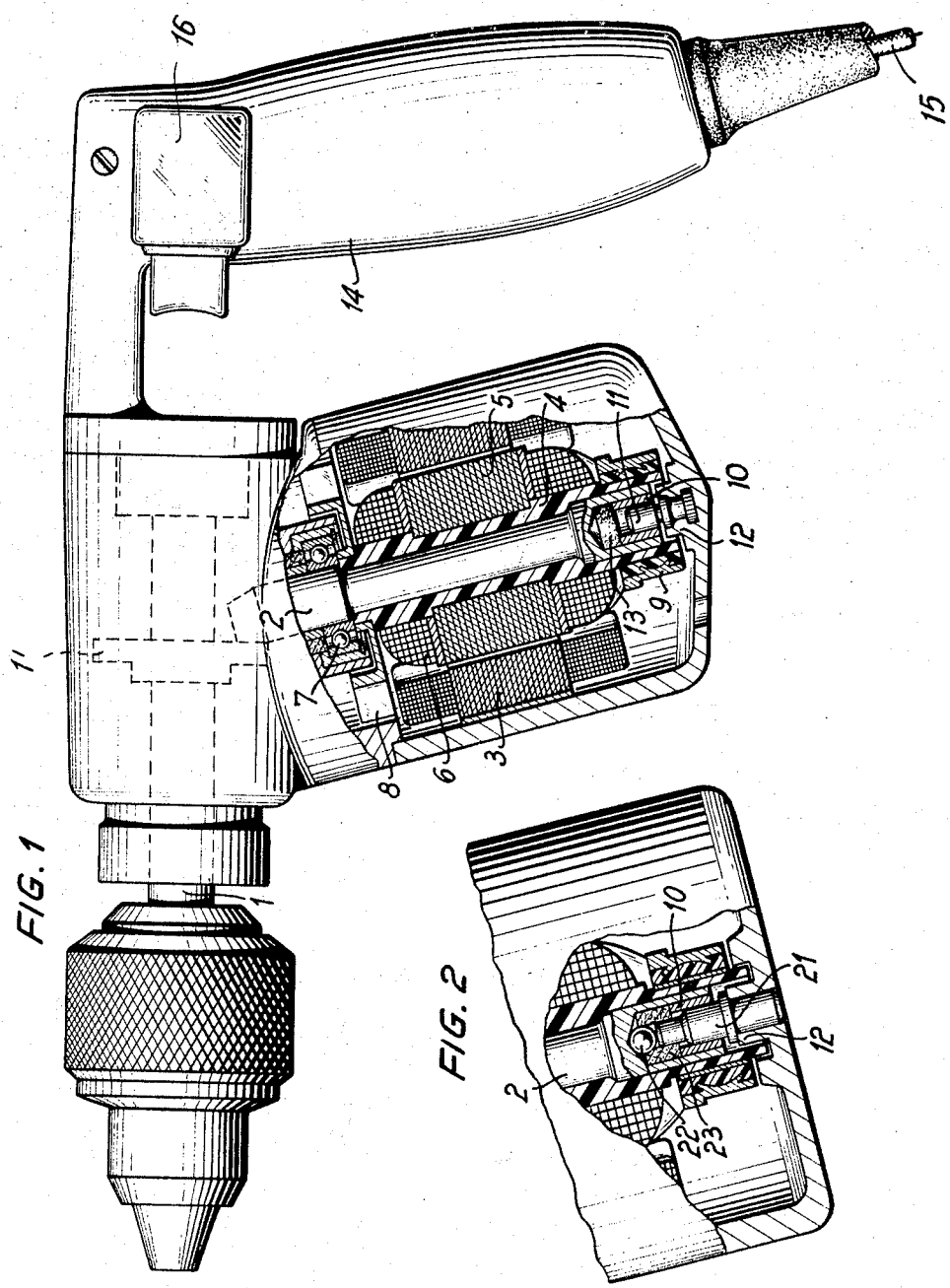

3,452,226
PORTABLE POWER TOOL OF COMPACT CONSTRUCTION
Alfred Hettich, Echterdingen, Germany, assignor to Robert Bosch G.m.b.H., Stuttgart, Germany
Filed Mar. 16, 1966, Ser. No. 534,731
Claims priority, application Germany, Apr. 30, 1965, B 81,682
Int. Cl. H02k 7/14
U.S. Cl. 310—50               9 Claims

ABSTRACT OF THE DISCLOSURE

A compact portable power tool has a housing in which a driven shaft is journaled for rotation. An electric motor is arranged in the housing and its drive shaft, whose axis is inclined to the axes of the driven shaft, is operatively connected with the latter for driving the same.

---

The present invention relates to a portable power tool. More specifically, the invention relates to a portable power tool of the type comprising a rotary output shaft. Still more specifically, the invention relates to a portable power tool of the above type which, as seen in axial direction of the output shaft, is of a particularly short configuration not known from the prior art.

Many different types and constructions of portable power tools, for instance electrically driven hand drills, are known. In all such tools known to me at this time the motor used for driving the output shaft is arranged in line with the output shaft; in other words, the driven shaft of the motor constitutes substantially an extension of the output shaft. While such constructions are not inoperative by any means, they do suffer from the disadvantage that machines so constructed must necessarily be relatively long since the output shaft and the motor must be accommodated in an in-line relationship. This makes it difficult to use such tools where the space available is limited.

It has therefore long been the desire of industry to obtain a portable power tool of shorter and more compact construction than those now known.

Accordingly, it is a general object of the present invention to overcome the disadvantages set forth above with reference to prior-art constructions.

A more specific object of the present invention is to provide a portable power tool of a construction which is considerably shorter than those known from the prior art.

A further object of the invention is to provide such a power tool in which the reduction in overall length of the tool is achieved by having the drive shaft of the electro motor used in the tool extend at an angle with reference to the driven output shaft thereof.

In accordance with one feature of the invention I provide a portable power tool which comprises a housing and a driven rotary shaft journaled in this housing. To provide power for the driven shaft I further include an electric motor means which is disposed in the housing and which has a drive shaft operatively connected with the driven shaft. The shortened overall dimension of my novel power tool is achieved by having the axes of the two shafts inclined with references to one another.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a side-elevational view, partly broken away and partly sectioned, of a portable power tool in accordance with the present invention;

FIG. 2 is a partly sectioned fragmentary view showing a modification in accordance with the present invention.

Discussing the drawing in detail, and firstly FIG. 1 thereof, it will be seen that the portable power tool shown therein is provided with a rotary output shaft 1 which may carry a chuck or similar element, not designated with a reference numeral since it is well known and requires no explanation. The rotary output shaft 1 is driven vi a bevel-gear arrangement 1' by the drive shaft 2 of an electromotor 3. Drive shaft 2 carries an insulating sleeve 4 which in turn has affixed thereto the core laminations 5 and the armature winding 6. Downwardly adjacent the bevel-gear arrangement 1' the drive shaft 2 is journaled in an antifriction bearing 7 which carries a cooling arrangement 8 affixed, as by adhesive means, to the insulating sleeve 4. The lower end of the drive shaft 2 is also surrounded by the insulating sleeve 4 and the latter carries the collector 9 which is suitably affixed, for instance by adhesive means.

The lower end portion of the drive shaft 2 is axially recessed and a shaft insert or bushing 10 of the permanently lubricated type is received in this axial recess, such as by being pressed thereinto. This bushing 10 serves as the bearing bushing and receives a pin 11 which is secured by any suitable means, such as casting, welding or the like, to the reinforced portion 12 of the machine housing. Lubrication of the bushing 10 is accomplished through an oil-saturated lubricating member 13, for example a strip of oil-saturated felt. The insulating sleeve 4 extends far enough downwardly in axial direction of the drive shaft 2 so as to surround and cover the pin 11 and the reinforced housing portion 12.

It should be understood that a similar bearing arrangement can of course also be provided at the other end of the drive shaft 2.

The tool shown in FIG. 1 is provided with a handle 14, in the illustrated embodiment assumed to be integral with the housing, and it will be seen that the elongated grip of this handle extends substantially parallel with the longitudinal axis of the drive shaft 2. This arrangement and the positioning of the electro motor with respect to the handle 14 makes it possible to hold the novel power tool in operating position for a prolonged period of time and without discomfort, owing to the advantageous location of the center of gravity resulting from this construction. Furthermore, and in keeping with one of the main considerations of the invention, this particular arrangement of the drive motor with respect to the output shaft 1 makes it possible to provide a portable power tool which is considerably shorter than those known to me from the prior art, thus making it possible to utilize this tool under conditions of limited space availability.

The arrangement for transmission of electrical energy to the motor is too well known to need describing. Merely for reference purposes there is shown in FIG. 1 an electrical conductor 15 leading to a pushbutton switch 16 which may be conveniently arranged in or on the handle 14 so that, by operating the switch 16, the tool operator may establish or interrupt the connection between the electrical conductor 15 and the electromotor 3.

The embodiment shown in FIG. 2 is based on a tool similar to the one in FIG. 1. The difference of the embodiment in FIG. 2 over that shown in FIG. 1 lies in the journaling of the drive shaft 2 of electromotor 3. In FIG. 2, just as in FIG. 1, only the lower end of drive shaft 2 is assumed to be journaled although, of course, both ends may be provided with such an arrangement. Again, the lower end of drive shaft 2 is axially recessed and disposed in this recess is the bushing 10. A pin 21 is secured to the reinforced housing portion 12 in a manner similar to the arrangement shown in FIG. 1. The difference here is the provision of a bearing ball 22 which is disposed intermediate the free end of the pin 21 and the inner end of the recess in drive shaft 2. An oil-saturated member, such as a sleeve 23 of felt, surrounds the free end of pin 21 and is arranged to lubricate pin 21 and bearing ball 22.

Of course, the bushing 10 may also be replaced with another journaling means of small size, for instance with a needle bearing. Also, whereas in the embodiment shown in FIG. 1 the inclination of the axis of drive shaft 2 with reference to the axis of driven shaft 1 will be seen to be approximately 75°, it will be understood that other relative positions of the two members are possible. Generally, a relationship wherein the axes of the two shafts define an angle of between 60 and 90° with one another has been found to be particularly advantageous. Furthermore, it is desirable to have the longitudinal axis of the tool handle, which latter may advantageously be of the pistol-grip or D-shaped type, extend substantially parallel with the longitudinal axis of the motor drive shaft 2. Naturally the invention is suitable not only for use in power hand drills, but also in other portable power tools such as thread cutters, power-operated nut- and screwdrivers, valve-seat grinders, and in a variety of other hand-carried powered-operated tools.

It will be understood that each of the elements described above, or two or more together, may also find a useful application in other types of portable power tools differing from the types described above.

While the invention has been illustrated and described as embodied in a portable power tool, it is not intended to be limited to the details shown, since various modifications and structural changes may be made without departing in any way from the spirit of the present invention.

I claim:

1. A portable power tool, comprising a housing; a driven rotary shaft journaled for rotation in said housing; electric motor means disposed in said housing and operative for rotating said driven shaft, said motor means including a drive shaft having a first end located adjacent said driven shaft associated therewith for rotating the same, and a second end located remote from said first end and provided with an axial recess, the axes of said shafts being inclined with reference to one another; and bearing means, including a first bearing portion received within said recess and a second bearing portion rigid with said housing and cooperating with said first bearing portion in said recess for rotatably journaling said drive shaft.

2. A portable power tool as defined in claim 1, wherein said axes of said shafts are located in a common plane.

3. A portable power tool as defined in claim 1, wherein said axes of said shafts define with one another an angle of between 60 and 90 degrees.

4. A portable power tool as defined in claim 1, wherein said first bearing potrion is a bushing and said second bearing portion is a pin having an end portion received within said bushing; and further comprising lubricating means for lubricating said pin and said bushing.

5. A portable power tool as defined in claim 1, wherein said first bearing portion is a bushing and said second bearing portion is a pin having an end portion received in said bushing and provided with an end face; and further comprising a bearing ball received in said bushing and engaging said end face of said pin and the inner end of the recess wherein said bushing is deposited and lubricating means for lubricating said pin and said bushing.

6. A portable power tool as defined in claim 1, said motor means including collector means provided in the region of said second end of said drive shaft, said second end having an endface provided with said recess and said collector means surrounding said second end rearwardly of but extending at least to said endface.

7. A portable power tool as defined in claim 1; and further comprising handle means on said housing and including an elongated grip extending in substatial parallelism with the axis of said drive shaft.

8. A portable power tool as defined in claim 7, wherein said handle is of annular configuration.

9. A portable power tool as defined in claim 7, wherein said handle is of annular configuration.

References Cited

UNITED STATES PATENTS

| 1,657,765 | 1/1928 | Pasque | 128—55 |
| 1,741,383 | 12/1929 | Stumpf | 310—50 X |
| 1,925,891 | 9/1933 | Apple | 310—265 |
| 2,264,033 | 11/1941 | Youhouse | 310—50 |
| 2,418,707 | 4/1947 | Groot | 310—90 X |
| 2,976,091 | 3/1961 | Miller | 308—212 |

FOREIGN PATENTS

| 715,973 | 1/1942 | Germany. |
| 897,906 | 5/1962 | Great Britain. |

WARREN E. RAY, *Primary Examiner.*

U.S. Cl. X.R.

77—7; 173—117, 170; 310—83, 90